United States Patent [19]

Vidal et al.

[11] 4,014,844

[45] Mar. 29, 1977

[54] PROCESS FOR GRAFTING POLYMERS ON CARBON BLACK THROUGH FREE RADICAL MECHANISM

[75] Inventors: Alain Vidal; Gerard Riess; Jean-Baptiste Donnet, all of Mulhouse, France

[73] Assignee: Agence Nationale de Valorisation de la Recherche (ANVAR), Neuilly sur Seine, France

[22] Filed: Apr. 2, 1975

[21] Appl. No.: 564,477

Related U.S. Application Data

[63] Continuation of Ser. No. 157,672, June 28, 1971, abandoned.

[30] Foreign Application Priority Data

June 26, 1970 France .................... 70.23691

[52] U.S. Cl. .................... 260/31.2 R; 106/307; 260/30.4 R; 260/32.4; 260/33.6 PQ; 260/33.6 UA; 260/33.8 UA; 260/42.53
[51] Int. Cl.² ...................................... C08K 3/04
[58] Field of Search ...... 260/42.53, 30.4 R, 31.2 R, 260/32.4, 33.6 PQ, 33.6 UA, 33.8 UA; 106/307

[56] References Cited

UNITED STATES PATENTS 3,297,466 10/1967 Herman et al. ................. 260/42.53

OTHER PUBLICATIONS

Kargin et al., Polymerization and Grafting Process on Freshly Formed Surfaces, in J. Polym. Sci., 52, 155, 1961.

*Primary Examiner*—James H. Derrington
*Attorney, Agent, or Firm*—Littlepage, Quaintance, Murphy & Dobyns

[57] ABSTRACT

A process for grafting polymers on carbon black through a free radical mechanism comprising contacting of the black with the polymer and a thermal treatment.

After formation of the carbon black mixture with at least one polymer, said mixture is degassed under vacuum at approximately room temperature, at least one substance acting as a solvent for said polymer is then introduced on said degassed mixture which is under vacuum, so as to form a solution of the latter containing the carbon black, said solution is heated with stirring at least at 50° C until a carbon black bearing polymer grafts is obtained and the latter can, if desired, be separated by filtration or centrifugation of the unattached polymer solution.

The carbon black products bearing polymer grafts as well as this carbon black itself are easily dispersed in solvents. They find valuable applications in paints, varnishes, printing inks, among others. The increase in dispersibility of the grafted carbon black improves its efficiency as a pigment, ultraviolet screening agent, filler, antioxidant, and the like.

10 Claims, No Drawings

PROCESS FOR GRAFTING POLYMERS ON CARBON BLACK THROUGH FREE RADICAL MECHANISM

This is a continuation of Application Ser. No. 157,672, filed June 28, 1971, which is now abandoned.

This invention relates to grafting of polymer chains on active fillers and, in particular, on carbon black.

Carbon black is a widely used product in numerous fields, for example, as a pigment for paints, varnishes, printing inks, etc. because of its ultraviolet absorbing properties, and in particular as a filler and antioxidant in all sorts of compositions such as synthetic and natural polymers, and especially in the field of elastomer and rubber treatment.

When using carbon black, difficulties are frequently encountered in its use when it is desired to obtain a fine homogeneous and stable dispersion of the black in the product into which it is incorporated. Numerous types of carbon black of various origins are commercially available whose fineness and nature differ and which cannot satisfy all requirements or which cannot do it in an entirely satisfactory fashion as far as each one of them is concerned.

In the prior art technique, numerous processes have already been described designed to improve the properties of carbon black, in particular, compatibility and dispersibility in the products treated and it has already been suggested, to this effect, to graft polymeric substances on carbon black, essentially through a free radical and anionic mechanism.

Grafting of polymer groups has not, by the way, been suggested only for carbon black, but, it has also been used for various fillers, particularly, inorganic fillers. An article illustrating this technique is that of V. A. KARGIN, N. A. PLATE, J. Polym. Sci. 52,155 (1961) entitled "Polymerization and grafting process on freshly formed surfaces."

Relevant bibliographic references in the field of the invention and concerning grafting of polymeric substances on carbon black through an anionic and free radical mechanism, particularly through thermal polymerization of vinyl monomers in the presence of carbon black are, for example, the following:

L. GELDKSICH, thesis presented at the Strasbourg Faculty of Sciences (France) on Mar. 29, 1965, entitled "Polymerisation thermique du styrene en presence de noir de carbone".

G. PETER, thesis presented at the Strasbourg Faculty of Sciences on Feb. 24, 1968, entitled "Contribution l'etude de la polymerisation thermique du styrene en presence de noir de carbone".

K. OKHITA, N. RITAMARA, I. ISUBATA, H. YA ASAKI, K. ROBAYASHI, Symp. on Carbon, Tokyo, 1964

K. O. HITA, N. KITAHARA, I. ISUBATA, Kogyo Kagaku Zasshi, 67, 591 (1964)

K. OKHITA, N. KITAHAR, H. YARASAKI, Nippon Gomu Kyokai-shi 38, 1, 1965.

Japanese Pat. No. 22,047/67 relating to the thermal polymerization of vinyl compounds in the presence of carbon black, for example at 140° C.

J. B. DONNET, A. VIDAN, G. RIBSS, Int. Symp. Nacromal. Chem. Budapest, August 25-30 1969 (Polymerization of styrene in the presence of carbon treated with lauroyl peroxide).

D. RIVIN, J. ARON, K.I. REDALIA, Rubber Chem. Techn. 41 (21,330, 1968) (Bonding of rubber to carbon black by sulfur vulcanization).

U.S. Pat. No. 3,346,535 describing the interaction of carbon black with an amide terminated polyacrylamide.

G. KAJOWSKI, thesis presented at the Strasbourg Faculty of Sciences, on May 1969 (Study of anionic grafting of polymers on carbon black)

K. RINCHA, R. KATANO, J. Appl. Polymer Sci. 13, 2057 (1969) (Graft copolymerization of styrene with carbon black alkali metal complex).

In general, the processes of the prior art technique, such as those mentioned above, by way of illustration, require relatively lengthy preparatory work involving the black and the monomers or polymers used in the reaction. The grafting ratios obtained are often low. In case of anionic polymerization, it is true that relatively greater grafting ratios can be obtained, but this process is limited to a certain number of monomers, particularly to certain vinyl or diolefinic derivatives, such as isoprene, styrene and butadiene. Moreover, the start up of such a process is rather delicate.

The invention relates to a process using a transfer reaction grafting operation of the free radical type between carbon black and at least one polymer which eliminates the previously mentioned drawbacks of the prior art technique.

The invention also relates to a process whose start up is easy and simple in comparison with the known anionic or free radical polymerization grafting processes, since it comprises thermal polymerization or polymerization induced by initiators of the peroxide type which are in solution or are attached to the carbon black.

The invention further relates to a process applicable to a large number of polymers (homopolymers or copolymers) even to those which cannot be obtained through a free radical mechanism or through normal anionic polymerization, as is the case, in particular for polypropylene and propylene base copolymers.

The invention further relates to a process applicable to polymer mixtures or to graft or block copolymers thus providing carbon blacks bearing multiple grafts.

The invention further relates to a process providing a high grafting ratio on the carbon black, particularly with polymers having a tertiary hydrogen atom.

The invention further relates to a product obtained using such a process, said product being a carbon black with a better dispersibility and better compatibility with the substances into which it is incorporated.

Thus, grafting processes are known in which the carbon black is placed in the presence of monomers, the latter being then polymerized through application of heat which provides the polymers grated on the carbon black.

The invention differs from this known technique and suggests a process which, in its most general form, consists in placing the carbon black in the presence of a solution of the already formed polymer, in heating until the polymer grafts are attached to the carbon black and in separating, from the solution, the carbon black bearing the polymer grafts. In the process of the invention, therefore solutions of the already existing polymer instead of monomer solutions are used at the beginning.

According to one embodiment of the invention, the process for grafting polymers on carbon black through a free radical mechanism including contacting of the carbon black with the polymer and thermal treatment comprises, after formation of the mixture consisting of the carbon black and at least one polymer, degassing said mixture under vacuum at approximately room temperature, then introducing into said degassed mixture, under vacuum, at least one substance acting as a solvent for said polymer so as to form a solution of the latter containing the black, heating said solution, with stirring, at 50° C at least until a carbon black is obtained bearing polymer grafts, and the latter can, as the case may be, be separated by filtration from the solution of unattached polymer.

The conditions for a starting up the process of the invention are not critical and must be adapted to each particular case according to the nature of the carbon black and of the polymer or polymers used.

Carbon blacks of any origin may be used, for example, of the furnace black, thermal black, channel black types, among others, such as those available on the market under the names "Philblack 0," "Graphone," "Spheron 6," "Sterling F.T.," "Aro 175" or "Supercarbovar."

As far as polymers are concerned, a large diversity of homopolymers or copolymers can be used, as well as mixtures of polymers and of graft or block copolymers. Examples of polymers which may be used are polystyrene, polyvinyl acetate, polypropylene, polymethyl methacrylate, acrylonitrile-styrene copolymers, polyvinyl chloride and the like. As noted previously, the process of the invention is also applicable to polymers which cannot be obtained through a free radical mechanism or through normal anionic polymerization, such as polypropylene and propylene based copolymers.

The polymers which provide the highest grafting ratios on carbon black are those which have a tertiary hydrogen atom in the molecule.

Degassing of the carbon black-polymer mixture is carried out under vacuum. The duration of the degassing operation is a function of the nature of the products treated and of the strength of the vacuum applied. As an indication, for a vacuum of $10^{-3}$ mm Hg and at room temperature, a degassing time greater than 24 h, particularly of approximately 36 h, is suitable as far as the invention is concerned.

In the consecutive step, a substance acting as a solvent for the polymer is introduced into the thus degassed carbon black-polymer mixture. This substance is introduced, for example by distillation onto the mixture which is under vacuum. However, the solvent can be introduced onto the mixture by other means known to one ordinary skilled in the art. This substance can simply be a solvent for the polymer under consideration, for example, an aromatic hydrocarbon, which may also be halogenated, such as benzene, toluene, xylene or an ether such as tetrahydrofuran, among others. As a varying embodiment, the solvent substance can be a monomer corresponding to the polymer used, for example, styrene, acrylonitrile, a styrene-arcrylonitrile mixture, vinyl acetate, etc. It is advantageous that the solvent substance used be also degassed before being introduced onto the black-polymer mixture.

The respective quantities of carbon black, polymer and solvent substance can vary widely. Generally, the polymer is evidently used in excess. It was also found that the grafting ratio has a tendency to increase with the carbon black concentration. Thus, the grafting yield, i.e., the percent of polymer attached with respect to the quantity of polymer used, can be increased if the carbon black/polymer ratio is increased and if the proportion of solvent in the reaction mixture is decreased. These general indications will make it possible for one ordinary skilled in the art to choose the conditions which are best adapted to the various particular cases involved.

The polymer solution containing the carbon black must be efficiently stirred so as to provide intimate and renexed contact to the black with the polymer. The heating temperature used in the thermal treatment is not critical. It must be higher than 50° C. In general, it is not useful to exceed temperatures of 250° C for economic reasons. Moreover, thermal degradation occurs above 250° C on most of the polymers studied. Temperatures in the range of about 90°–100° C, for example 95° C, are quite suitable in numerous cases. In general, the heating time must be extended at the temperatures indicated, i.e., it generally exceeds 1 hour at average temperatures of 90°–100° C previously indicated. Times of the order of 24 hours are suitable.

In actual fact, treatment times are shorter at higher temperatures. A suitable grafting ratio is obtained, for example, with a time of 10 to 15 minutes in the range of 200°–250° C.

Generally, the grafting ratio increases with treatment time, heating temperature remaining substantially constant. Thus, for example, for polystyrene, a grafting ratio of 2.88% is obtained after a one hour treatment and of 8.5% after 24 hours, using a temperature of 95° C.

In the lower temperature range, the treatment time can be as high as 48 or 72 hours in order to provide a sufficient grafting ratio, i.e., of the order of 1 to 2%.

After this stirring step in a hot solution, comprising simple mechanical stirring of the polymer and carbon black, a product containing carbon black bearing polymer grafts is obtained directly. For certain applications, for example, paints, this product can be used as such, i.e. without the necessity of separating the unattached polymer. It should be noted that the polymer unattached chemically does not in any way hinder the final reaction product.

In an optional subsequent step, it is possible, however, to separate the carbon black bearing grafted polymer groups from the polymer solution using any known filtration means, for example, centrifugation. This separation was carried out in the following illustrative examples so as to make it possible to analyze the carbon black obtained.

The products comprising carbon black bearing polymer grafts as well as this black itself, are easily dispersed in the solvents. They find valuable applications in paints, varnishes, printing inks, among others. The increase in dispersibility of the grafted black improves its efficiency as a pigment, ultraviolet filter, filler, antioxidant and the like.

The invention is illustrated, without being in any way limited thereto, by the following examples:

EXAMPLE 1

1.35 g of "Philblack 0" carbon (furnace black HAF, Phillips Petroleum Co. U.S.A.) and 2 g of polystyrene ($M_n$ = 350,000) are degassed for 36 hours at room temperature. After degassing, a solvent for the polymer, toluene, which is itself degassed, is distilled onto the mixture. The reactor is sealed under vacuum and heated at 95° C for 24 hours, the reaction mixture being efficiently stirred. The black bearing polymeric grafts is then separated by centrifugation of the remaining homopolymer.

The grafting ratio, calculated on the basis of elemental analytical results of the filler separated from the homopolymer, shows that the latter contains 8.5% of grafted polystyrene with respect to the black.

EXAMPLE 2

The procedure of example 1 was followed except that polyvinyl acetate was substituted for the polystyrene. The fraction decanted comprised 7.7% of grafted polyvinyl acetate.

EXAMPLE 3

The procedure followed was identical with that of example 1, except that amorphous polypropylene ($\overline{M}_w = 71\,000$) was substituted for the polystyrene. In this case, the grafting ratio was 7%.

EXAMPLE 4

Procedure 1 was followed except that polymethylmethacrylate ($\overline{M}_w = 106\,000$) was substituted for polystyrene. The observed grafting ratio was 3%.

EXAMPLE 5

The procedure followed was identical with that of example 1 except that acrylonitrile-styrene copolymor assaying 24% of acrylonitrile ($\overline{M}_w = 575\,000$) was substituted for the polystyrene. The observed grafting ratio, as determined by Kjeldahl analysis, was 8 %.

EXAMPLE 6

Procedure 1 was followed except that polyvinyl chloride ($\overline{M}_w = 40\,000$) was substituted for the polystyrene and that tetrahydrofuran was used as the solvent. The grafting ratio, as determined by chlorine analysis, was 5.9%.

EXAMPLE 7

Procedure 1 was followed except that "Graphon" ("Spheron 6" treated with graphite at a high temperature 1700° C, GL Cabot, U.S.A.) was substituted for "Philblack O". For such a black freed of surface functional groups, the grafting ratio was only 1.5%.

EXAMPLE 8

Substitution of "Spheron 6" (channel black, MPC, G. L. Cabot, U.S.A.) for "Philblack O" in example 1, led to a grafting ratio of 8%.

EXAMPLE 9

Still following procedure 1, and using, as a filler "Sterling F.T." (thermal black F.T., G. L. Cabot, U.S.A.), the observed grafting ratio was only 1.2%.

EXAMPLE 10

A procedure was followed as in example 1, using "Aro 175" (furnace black, J. M. Huber Co. U.S.A.) which led to a grafting ratio of 5%.

EXAMPLE 11

A procedure was followed as in example 1, using "Supercarbovar" black (channel black of the coloring type, G. L. Cabot, U.S.A.) which led to a grafting ratio of polystyrene on the black of 11.5%.

EXAMPLE 12

The object of this example is to show that the grafting ratio increases with carbon black concentration.

The procedure was the same as in example 1 (polystyrene heated at 95° C in the presence of "Philblack O") with varying concentrations of carbon black in the reaction mixture. The results obtained are summarized in the following table:

| Carbon black concentration grams per 50 cm³ of toluene | 0.542 | 0.813 | 1.084 | 1.355 |
|---|---|---|---|---|
| Grafting ration % | 4.8 | 5.3 | 6.8 | 8.5 |

In this case, the grafting yield was 7 – 10%. A 10% yield, although relatively low in absolute value, is suitable for substantial modification of the carbon black surface properties and for obtaining valuable results as far as dispersibility of the grafted black is concerned.

EXAMPLE 13

The object of the example is to show that the grafting ratio increases with thermal treatment time.

A procedure similar to that of example 1 used wherein the carbon black and polystyrene mixture was heated at 95° C. Depending on heating time, the following grafting ratios were obtained:

| 1 hour | 2.88% |
|---|---|
| 2 hours | 3.64% |
| 4 hours | 4.7% |
| 16 hours | 6.5% |
| 24 hours | 8.5% |

EXAMPLE 14

A procedure similar to that of example 1 was used except that styrene monomer was substituted for the toluene used as solvent. Equivalent results were obtained. The grafted carbon black product suspended in styrene can be used directly as an easily dispersible pigment.

We claim:

1. A process for grafting polymers on carbon black through a transfer reaction free radical mechanism which comprises (1) forming a reaction mixture consisting of carbon black and at least one polymer containing a tertiary hydrogen atom, (2) degassing said mixture under vacuum at approximately room temperature, (3) adding at least one substance that is a solvent for said polymer to said degassed mixture, under vacuum, to form a solution of the said polymer containing the carbon black and (4) heating said solution to a temperature of at least 50° C at which said reaction takes place and continuing the reaction until the desired carbon black bearing polymer graft is obtained.

2. A process for grafting polymers on carbon black through a transfer reaction free radical mechanism which comprises (1) forming a reaction mixture consisting of carbon black and at least one polymer from the group consisting of polystyrene, polyvinyl acetate, polypropylene, polymethyl methacrylate, acrylonitrile-styrene copolymers, polyvinyl chloride and propylene based copolymers, (2) degassing said mixture under vacuum at approximately room temperature, (3) adding at least one substance that is a solvent for said polymer to said degassed mixture, under vacuum, to form a solution of the said polymer containing the carbon black and (4) heating said solution to a temperature of a least 50° C at which said reaction takes place and continuing the reaction until the desired carbon black bearing polymer graft is obtained.

3. The process of claim 1, in which the carbon black bearing polymer grafts are separated from the unreacted polymer.

4. The process of claim 1, in which said heating step which forms said carbon black bearing polymer grafts is done while stirring the mixture.

5. A process of claim 1 wherein a solvent for the polymer is introduced into the degassed carbon black-polymer mixture by distillation.

6. A process according to claim 1 wherein the solvent is at least one monomer corresponding to the polymer is introduced into the degassed carbon black-polymer mixture.

7. The process according to claim 6 wherein the monomer is selected from the group consisting of styrene, acrylonitrile, a styrene acrylonitrile mixture and vinyl acetate.

8. The process according to claim 1 wherein the carbon black bearing polymer graft is separated from the solution containing unattached polymer.

9. A process according to claim 1 wherein said polymers are selected from the group consisting of graft copolymers, block copolymers, and polymer mixtures.

10. A process according to claim 1 wherein the degassing of the carbon black-polymer mixture is carried out in a vacuum of 10 Hg at room temperature for a period of time of at least 24 hours.

* * * * *